(12) United States Patent
Smithey et al.

(10) Patent No.: US 8,019,353 B1
(45) Date of Patent: Sep. 13, 2011

(54) METHOD AND SYSTEM FOR REPORTING FIBER OPTIC DELAY FOR USE IN LOCATING A WIRELESS COMMUNICATION DEVICE

(75) Inventors: Paul S. Smithey, Olathe, KS (US); Gene S. Mitchell, Jr., Blue Springs, MO (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1434 days.

(21) Appl. No.: 11/455,955

(22) Filed: Jun. 20, 2006

Related U.S. Application Data

(63) Continuation-in-part of application No. 11/365,379, filed on Mar. 1, 2006.

(51) Int. Cl.
*H04Q 7/20* (2006.01)
*H04B 10/08* (2006.01)

(52) U.S. Cl. ........................ 455/456.1; 398/25

(58) Field of Classification Search .... 455/456.1–456.6, 455/414.1–414.4; 398/25, 3–5
See application file for complete search history.

(56) References Cited

U.S. PATENT DOCUMENTS

| 2004/0166873 | A1 | 8/2004 | Simic et al. |
| 2005/0113117 | A1 | 5/2005 | Bolin et al. |
| 2007/0127919 | A1* | 6/2007 | Kallstenius ............. 398/25 |

OTHER PUBLICATIONS

Ralph J. Pasquinelli and Dave McDowell, "Fiber Optic Delay Tracking Experiment," Fermi National Accelerator Laboratory, BD RFI Note#001, Dec. 1, 2000.

* cited by examiner

*Primary Examiner* — George Eng
*Assistant Examiner* — Khawar Iqbal

(57) ABSTRACT

A method and system for facilitating location of a wireless communication device communicating via a communication path that includes a fiber optic cable is disclosed. The delay associated with a communication propagating through a fiber optic cable can be used to more accurately determine inputs used when locating a device using triangulation. The delay introduced by the cable may vary with the temperature of the cable. Therefore, the temperature associated with the cable is measured and used to determine a delay associated with the fiber optic cable. An indicator of the delay may then be used by a positioning system to more accurately locate a wireless communication device.

18 Claims, 10 Drawing Sheets

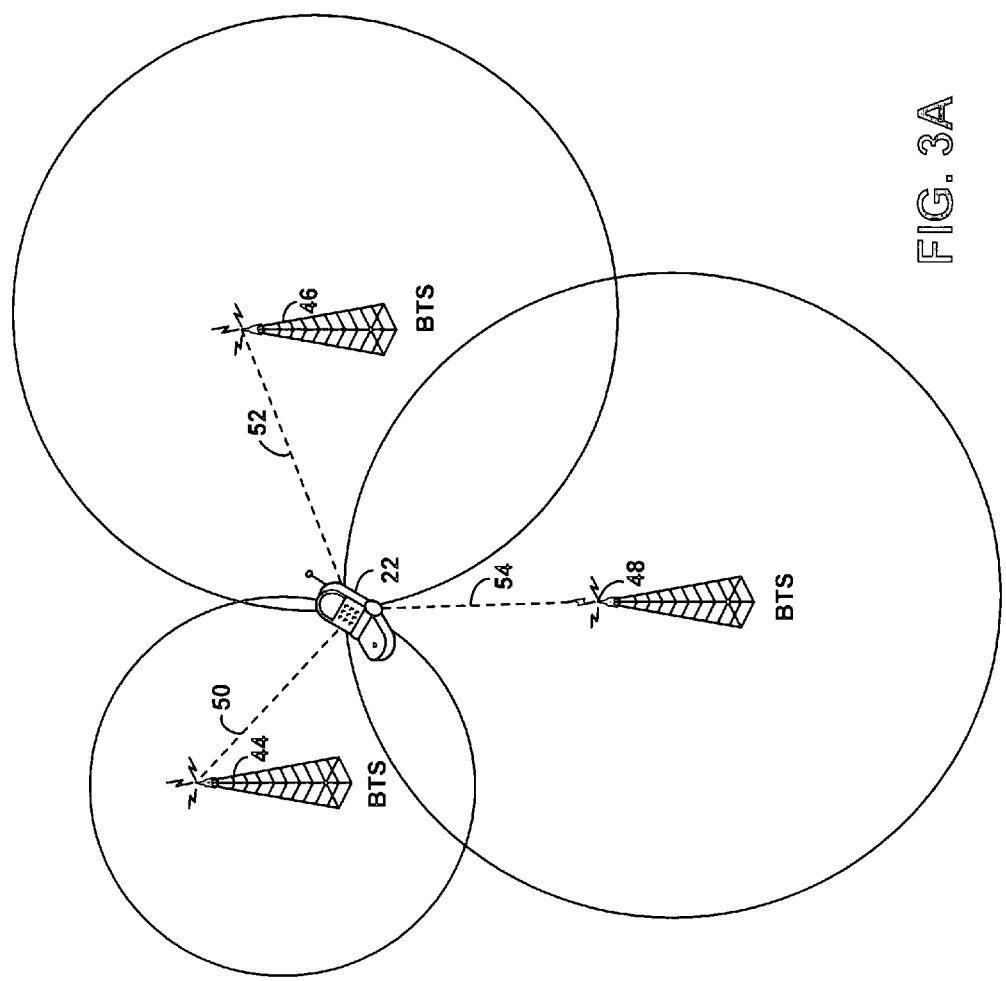

METHOD AND SYSTEM FOR REPORTING FIBER OPTIC DELAY FOR USE IN LOCATING A WIRELESS COMMUNICATION DEVICE

REFERENCE TO RELATED APPLICATION

This is a continuation-in-part of U.S. patent application Ser. No. 11/365,379, filed on Mar. 1, 2006.

BACKGROUND

When a user in a wireless communications network initiates a communication session, the nature of the communication may necessitate locating the user. Commonly, a user must be located when the user places a "9-1-1" emergency telephone call. Other scenarios exist as well. For example, a user may contact a service provider requesting directions to nearby restaurants or to a gas station. To provide accurate information, the service provider must be able to determine the user's location.

The advent of cellular telephones required new locating technology. Previously, 911 calls originated mainly from landline telephones. Therefore, the process of determining the location of a caller was usually a simple matter of looking up the street address of the calling telephone number. Unlike landline telephones that were fixedly associated with particular street addresses, cellular telephones could place calls from anywhere within a cellular coverage area. Thus, a more complex system of position determination was required in order to determine the location of a calling cellular telephone.

To facilitate 911 services for cellular telephone callers, the United States Federal Communication Commission (FCC) mandated the implementation of "Enhanced 911" ("E911") services. The E911 mandate was divided into two phases. According to Phase 1, the location had to be identified with an accuracy of at least cell and sector. As this information is typically maintained by a cellular wireless carrier in a subscriber's home location register ("HLR"), Phase 1 presented little technical challenge. According to Phase 2, the location must be provided with far more granularity than the cell and sector information maintained in the HLR. In response, the Telecommunications Industry Association (TIA) has proposed a standard entitled "Enhanced Wireless 9-1-1 Phase 2" or "J-STD-036-A" (including a recent addendum, J-STD-036-A-2002), the entirety of which is hereby incorporated by reference.

In order to achieve the accuracy specified by Phase 2, a service provider may employ a wireless position determining system that communicates with a wireless communication device (WCD), such as a cellular telephone, in order to determine its current location. The positioning system could be "handset-based," in which case the cellular telephone would read its geographic coordinates from a satellite based positioning system (e.g., GPS) and report the coordinates over an air interface to the carrier. Alternatively or additionally, the positioning system could be "network-based," in which case the carrier might employ a technique such as triangulation, (e.g., Advanced Forward Link Trilateration (AFLT) or Enhanced Forward Link Triangulation (EFLT)), to measure the telephone's location. Such network-based techniques may also be combined with handset-based techniques.

When a positioning system performs triangulation, the system determines the location of a WCD based on two or more fixed locations, such as the locations of base transceiver stations (BTSs). Triangulation can be carried out using various methods. In its most basic form, the angle of arrival of an incoming signal is measured at two or more stationary locations. Then, a system performing triangulation creates paths, extending radially at the angle of arrival, from each stationary location. The intersection of these paths is the estimated location of the device.

Recently, more sophisticated triangulation techniques have been developed, using the delay between a WCD and two or more BTSs (preferably three BTSs) to locate a device. Specifically, the time a signal spends traveling over an air interface between the WCD and each BTS is measured and reported to a positioning system. Using that delay, along with the known speed of the signal, the distance between the WCD and each BTS can be calculated. Then, an arc with a radius extending the distance to the WCD is centered on each BTS. The intersection of these arcs provides the estimated location of the WCD.

SUMMARY

When a repeater is present in a wireless communication network, locating a user can be difficult. Repeaters are commonly used in wireless communication networks to extend coverage and/or amplify signals in areas that are not adequately served by a BTS (e.g., rural areas or enclosed areas such as buildings or subways). Typically, repeaters are placed between a WCD and a BTS. Therefore, a WCD may communicate over an air interface with a repeater that receives, amplifies, and transmits the communication to a BTS (and vice versa). The presence of the repeater introduces additional time delay between the WCD and the BTS. In the case of a fiber-fed repeater, which is connected to a RAN with a fiber optic cable, a signal may experience delay when traveling from the repeater to the BTS via the fiber optic cable. Since positioning systems using triangulation often rely on the delay between the WCD and the BTS, the delay introduced by a repeater can significantly impact locating accuracy.

Disclosed herein is a method for locating a wireless communication device communicating via a communication path, wherein the communication path includes a fiber optic cable. The method comprises: (i) receiving at least one measure of temperature associated with the fiber optic cable, (ii) using the measure of temperature to determine a delay associated with the fiber optic cable; and (iii) using the determined delay to determine a location of the wireless communication device.

Also disclosed herein is another method for locating a wireless communication device communicating via a communication path, wherein the communication path includes a fiber optic cable. The method comprises (i) measuring temperature associated with the fiber optic cable (ii) using the measured temperature as a basis to determine a delay associated with the fiber optic cable, and (iii) sending an indicator of the determined delay to a position-determining system. The positioning system can then use the determined delay as a basis to determine a location of the wireless communication device.

Additionally, described herein is a system facilitating location of a wireless communication device engaged in a communication via a communication path, wherein the communication path comprises a fiber optic cable. The system comprises (i) a processor for executing program logic, (ii) a reporting modem communicatively linked with the processor, and (iii) data storage communicatively linked with the processor and containing program logic executable to (a) compute a delay associated with the fiber optic cable and (b) cause the reporting modem to send an indicator of the computed delay to a positioning system. The position-determining system may function to use the indicator of the delay as a basis for locating the wireless communication device.

An exemplary system uses the delay associated with a fiber optic cable to locate a WCD when the communication path includes a fiber-fed repeater, which is connected to a radio access network via a fiber optic cable. Initially, the determined delay can be used to determine the delay between the repeater and the WCD, which in turn can be used as a basis for calculating the distance between the WCD and the repeater. The position-determining system may then use the distance between the WCD and the repeater to improve triangulation calculations.

BRIEF DESCRIPTION OF THE DRAWINGS

An exemplary embodiment of the present invention is described herein with reference to the drawings, in which:

FIG. 3A is a diagram depicting a portion of a wireless communication system in which the exemplary embodiment can be employed;

DETAILED DESCRIPTION

Figure 1:
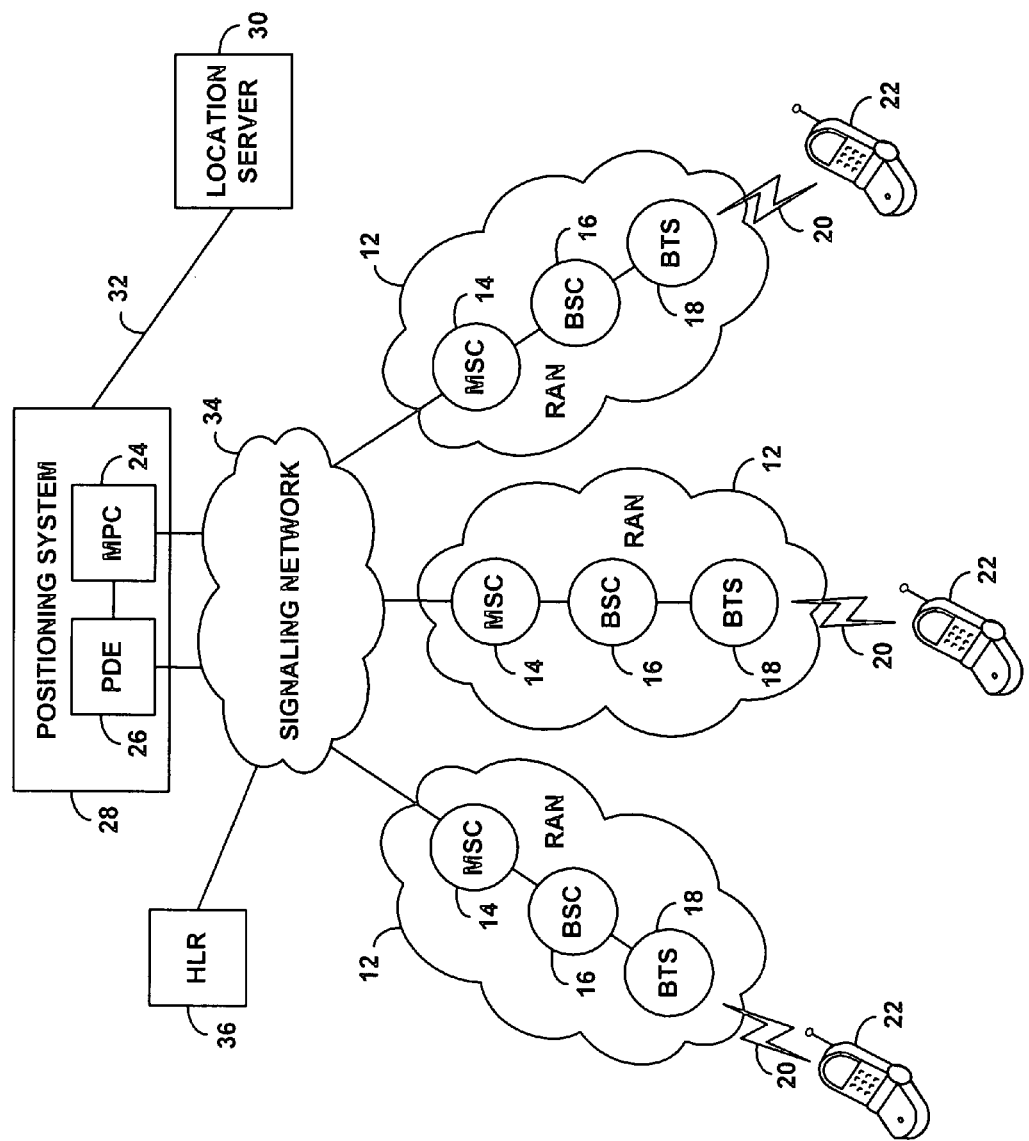
FIG. 1 is a simplified block diagram depicting a wireless communication system in which the exemplary embodiment can be employed.

Referring to the drawings, FIG. 1 is a simplified block diagram of a wireless communication system in which an exemplary embodiment of the invention can be employed. In such a wireless communication system, a wireless carrier typically operates a number of radio access networks (RANs) 12, each of which is controlled by a switching entity such as a mobile switching center (MSC) 14. The MSC generally includes or connects with one or more base station controllers (BSCs) 16, which in turn connect with one or more base transceiver stations (BTSs) 18. Each BTS conventionally includes a cell tower with one or more antennas that radiate to define an air interface 20 in which wireless communication devices (WCDs) 22 can operate. While FIG. 1 shows each BTS 18 communicating with a different BSC 16, each BSC 16 may serve more than one BTS 18.

In a common arrangement, a wireless carrier will operate a mobile positioning center (MPC) 24 that is arranged to determine and report WCD locations to requesting entities. The MPC may include or have access to a position determining entity (PDE) 26 (also referred to herein as a "positioning system"), which may operate to determine the location of a given WCD based on (i) network information and/or (ii) satellite-based positioning information. FIG. 1 depicts the MPC 24 and PDE 26 as components of a positioning system 28; in other cases, the positioning system 28 can take other forms, possibly including just one of these entities or some other entities altogether. Further, the carrier may operate a location server 30 that acts as a front end for receiving location requests from location-based service (LBS) applications and forwarding those requests to the MPC.

In a typical arrangement, the communications from the positioning system 28 to the WCD 22 will go to and from the MPC/PDE over a signaling network 34 (e.g., a Signaling System #7 (SS7) network or an IP signaling network) to the MSC 14 of the RAN. In order to send any such requests, the MPC 24 may query a home location register (HLR) 36, also via the signaling network, to determine the point code subsystem number (PC_SSN) of the MSC currently serving the WCD. For instance, the MPC may send an IS-41 Location Request (LOCREQ) to the HLR, or an IS-637 SMS Request (SMSREQ) message to the HLR, providing the HLR with an identifier of the WCD, and the HLR would respond (in a Location Request return result (locreq_rr) or SMS Request return result (smsreq_rr)) with the PC_SSN of the currently serving MSC (or a last known serving MSC). The query to the HLR could carry an identifier of the WCD (such as a mobile directory number (MDN)) as indicated in the initial location request to the MPC. The PDE can then establish communications with the WCD via the MSC currently serving the WCD.

The PDE 26 may employ various techniques to locate a WCD 22. For example, the PDE may use triangulation, GPS tracking, or a combination of these techniques (e.g., Advanced GPS software such as SNAPTRACK, manufactured by Qualcomm Incorporated of San Diego, Calif., which uses triangulation to enhance GPS coordinates). To perform triangulation, exclusively or in combination with other locating techniques, a positioning system uses at least two stationary sources capable of communicating with a WCD, such as two or more BTSs accessible to the WCD via an air interface. In particular, the PDE can use the round-trip delay between the WCD and each BTS, along with the location of each BTS, as a basis for triangulation. In practice, triangulation usually requires three or more BTSs. Theoretically, only two BTSs are required, but the accuracy using two BTSs is usually inadequate. The explanation of FIG. 3A below elaborates further on triangulation.

Figure 2:
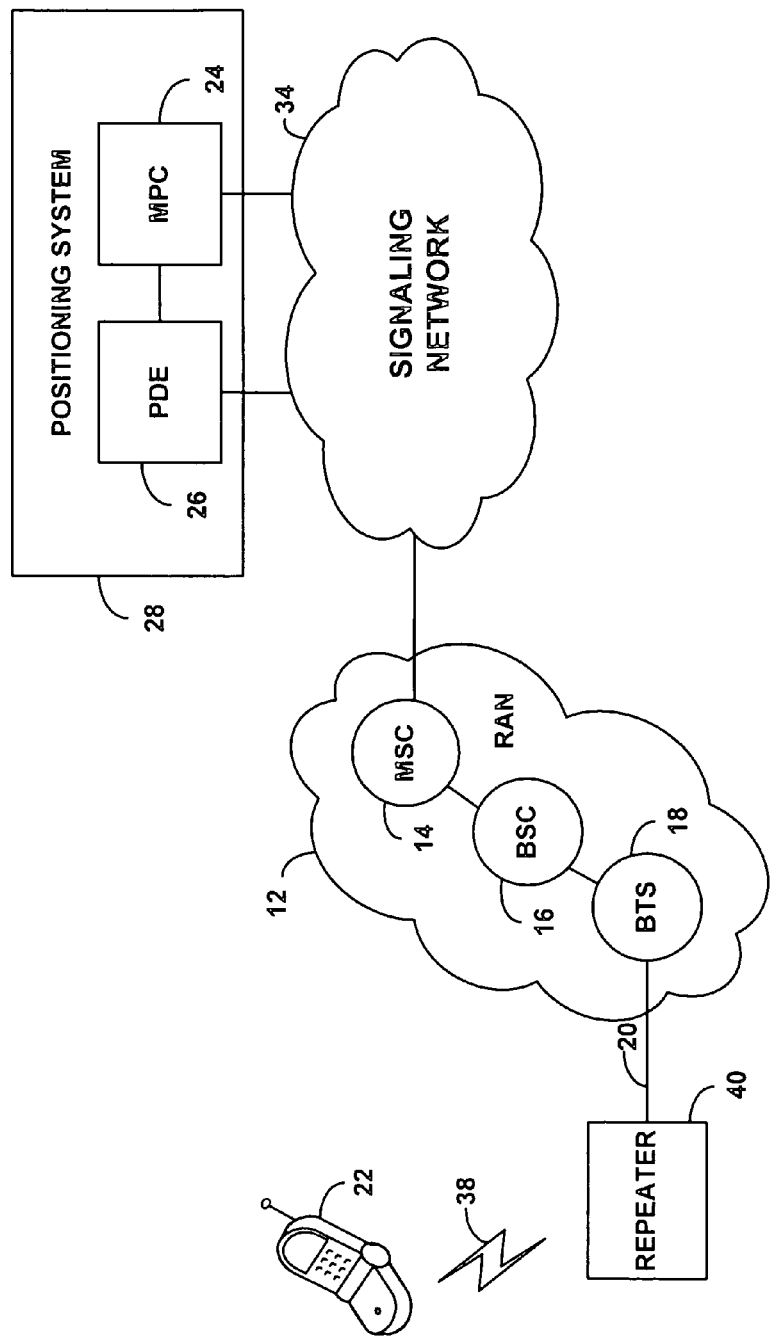
FIG. 2 is also a simplified block diagram depicting a wireless communication system in which the exemplary embodiment can be employed.

FIG. 2 is also a simplified block diagram of a wireless communication system in which an exemplary embodiment of the invention can be employed. FIG. 2 is similar to FIG. 1, but includes a fiber-fed repeater 40. FIG. 2 shows a fiber-fed repeater 40 that is operable to communicate with WCD 22 over air interface 38 and with BTS 18 over fiber optic cable 20. Of particular significance, placing repeater 40 between WCD 22 and BTS 18 creates additional delay between WCD 22 and BTS 18. Specifically, traveling through fiber optic cable 20, from the repeater 40 to BTS 18, delays a communication. Such additional delay can interfere with triangulation calculations.

FIG. 3A shows an exemplary set of BTSs 44-48 that could be part of one or more RANs, such as those shown in FIG. 1 or 2, or any other wireless communication network. WCD 22 is capable of communicating with each BTS 44-48. Given such a configuration, the attributes of BTSs 44-48 can be used by a positioning system when locating WCD 22. Specifically, a positioning system may use attributes, such as the locations of BTSs 44-48 and the delay between WCD 22 and each BTS 44-48, to perform triangulation.

Triangulation may be "angle-based" or "delay-based" (or may take other forms now known or later developed). Older triangulation algorithms were generally angle-based, using an angle of arrival at a plurality of stationary sources to estimate the location of a device. Currently, most triangulation algorithms are delay-based, using the delay between each of a plurality of BTSs and a WCD as a basis for locating a WCD. Examples of such techniques include time of arrival, time difference of arrival, enhanced observed time difference of arrival, advanced forward link trilateration, and enhanced forward link triangulation, among others. For simplicity, delay-based triangulation will be described generally. However, those skilled in the art will recognize that the present invention can be used to enhance networks using most any delay-based triangulation technology, and perhaps other location-determination techniques as well.

When performing delay-based triangulation, a positioning system must first identify a sufficient number of BTSs capable of serving the WCD 22 (usually three or more). In addition, the positioning system must know the distance between each identified BTS 44-48 and WCD 12, and the location of each BTS. The PDE may use the delay between the BTS and the WCD to calculate distance between the BTS and the WCD. For example, the PDE may calculate the distance by multiplying the delay by the signal speed over the air interface between the BTS and WCD. The delay may be retrieved from WCD 22 and may include identifiers of each BTS 44-48 and the round-trip delay between each BTS 44-48 and the WCD 22.

To retrieve the location of each BTS the positioning system may include or have access to a BTS-location database (not shown). This database could be coupled directly to the positioning system, or could be accessible to the positioning system via a radio access network, packet-switched network, or other means. Therefore, to retrieve the locations of the BTSs 44-48, the positioning system can conveniently query the BTS-location database with the identifier of each BTS 44-48. The positioning system can then use the location and associated round-trip delay of each BTS 44-48 to perform triangulation.

To perform triangulation, the positioning system may create an arc centered around each BTS 44-48, each arc having a respective radius 50-54. Radii 50-54 represent the distances between each BTS 44-48 and WCD 22, respectively. As discussed above, radii 50-54 can be calculated using the delay between each BTS 44-48, respectively, and WCD 22. Utilizing the arcs created by radii 50-54, the positioning system may conclude WCD 22 is located at the intersection of these arcs.

Figure 3B:
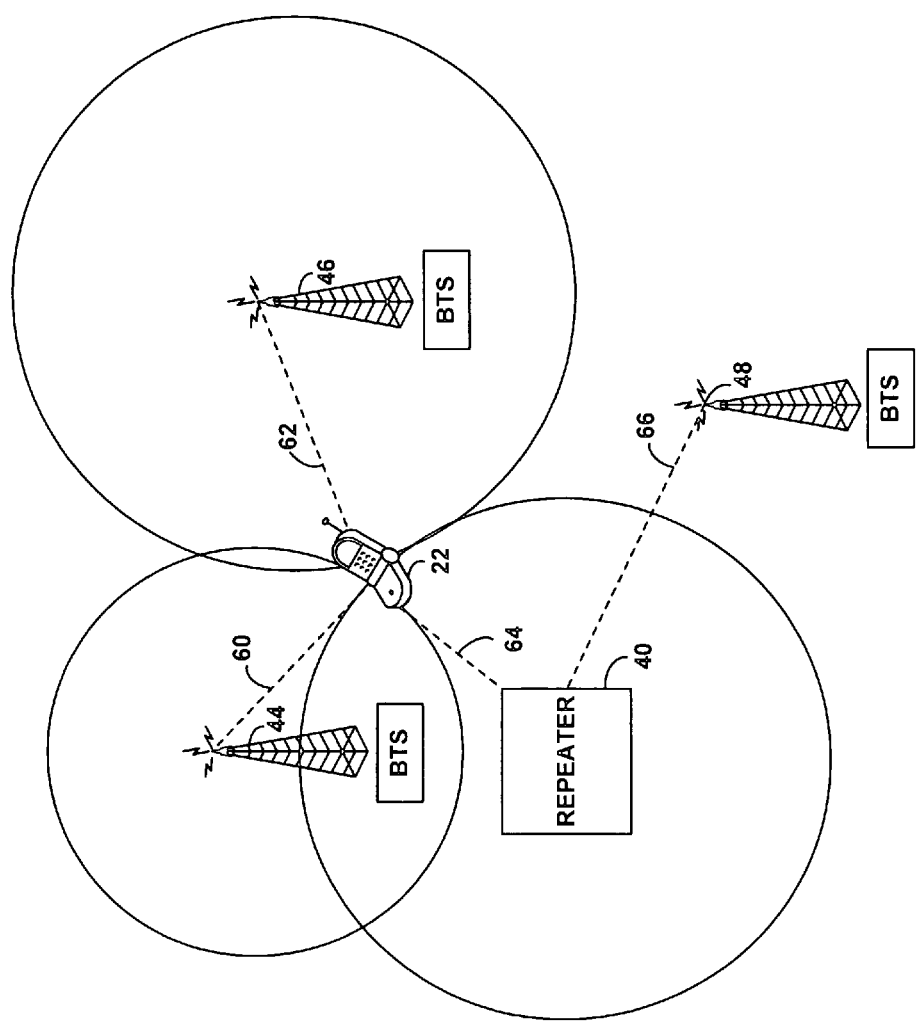
FIG. 3B is also a diagram depicting a portion of a wireless communication system in which the exemplary embodiment can be employed.

FIG. 3B also shows an exemplary set of BTSs 44-48 capable of serving WCD 22. However, unlike FIG. 3A, where each BTS is in direct communication with WCD 22, a wireless repeater 40 is located between BTS 48 and the WCD 22. As the repeater 40 creates additional delay between BTS 48 and WCD 22, using the delay between the BTS 48 and WCD 22 may result in a less accurate triangulation and thus less accurate location determination. Some locating methods may simply use an alternative BTS. However, in some such situations no alternatives may exist or alternatives may provide less accurate results. Therefore, a means for locating WCD 22 using the communication path from WCD 22 to BTS 48 is desirable.

More specifically, locating accuracy may be improved by using attributes of repeater 40 in lieu of BTS 48 when locating WCD 22. For instance, when performing triangulation based on repeater 40, the PDE may use the delay between the repeater 40 and WCD 22 to calculate the distance between repeater 40 and WCD 22. The PDE may then use the location of repeater 40 and the distance between repeater 40 and WCD 22 (radius 64), rather than the location of BTS 48 and the distance between BTS 48 and WCD 22, as a basis for triangulation.

Figure 4:
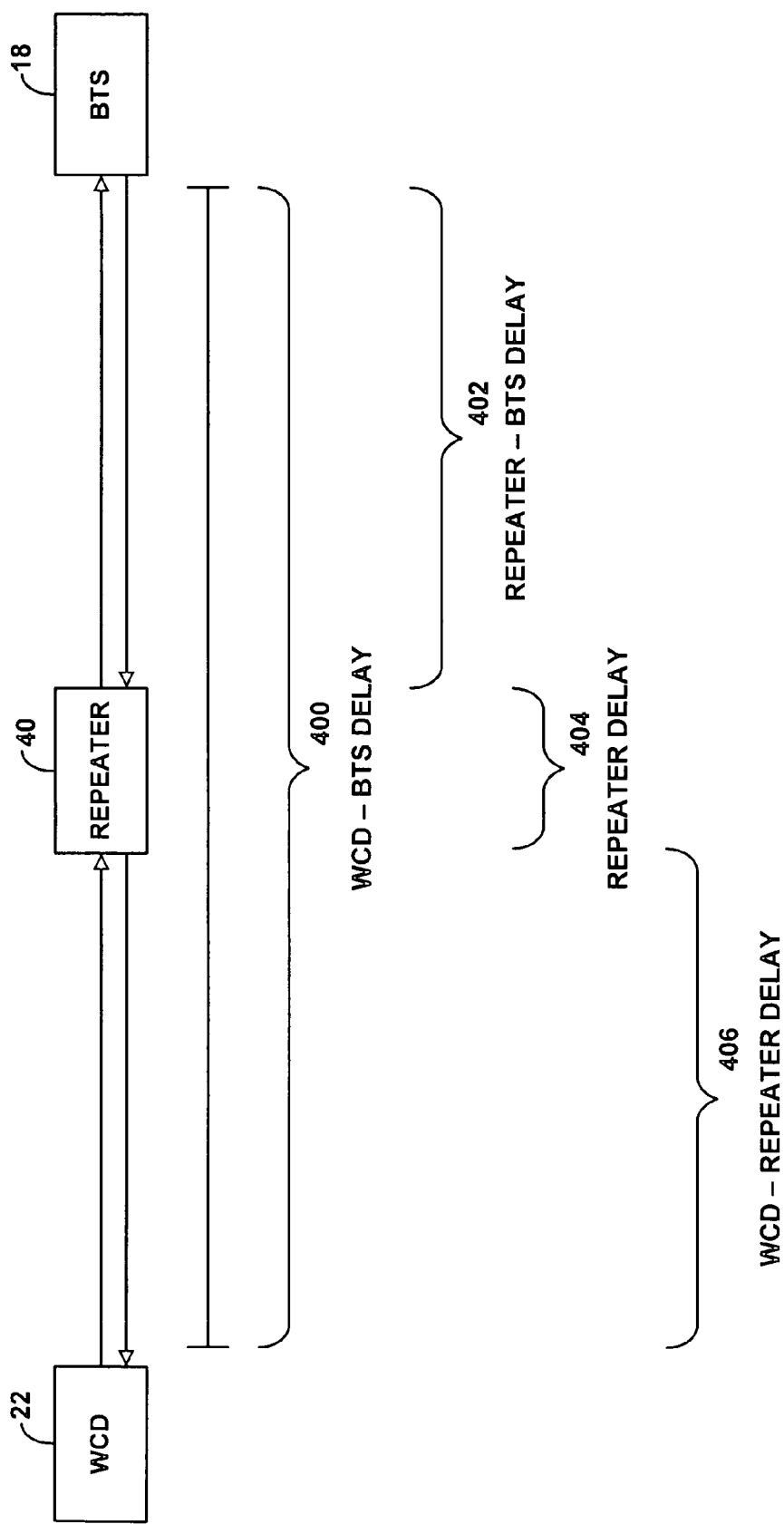
FIG. 4 is a communication flow diagram illustrating delays in a wireless communication system in which the exemplary embodiment can be employed.

FIG. 4 is signal flow diagram showing delays that a signal may experience traveling between a WCD to a BTS via a repeater. These delays may be used to calculate the delay between a repeater and a WCD, which is generally unknown. The WCD-BTS delay 400 is the delay between the WCD 22 and the BTS 18, the repeater-BTS delay 402 is the delay between the repeater 40 and BTS 18, and the repeater delay 404 is the delay that is introduced as the communication passes through the repeater itself. In the case of a fiber-fed repeater, the Repeater-BTS delay is the delay introduced by a fiber optic cable connecting repeater 40 and BTS 18. Provided with values of these delays 400-404, the positioning system can readily calculate the WCD-repeater delay 406, which is the delay between WCD 22 and repeater 40. Specifically, the positioning system may calculate the WCD-repeater delay 406 by subtracting the repeater-BTS delay 402 and/or the repeater delay 404 from the WCD-BTS delay 400.

Figure 5A:
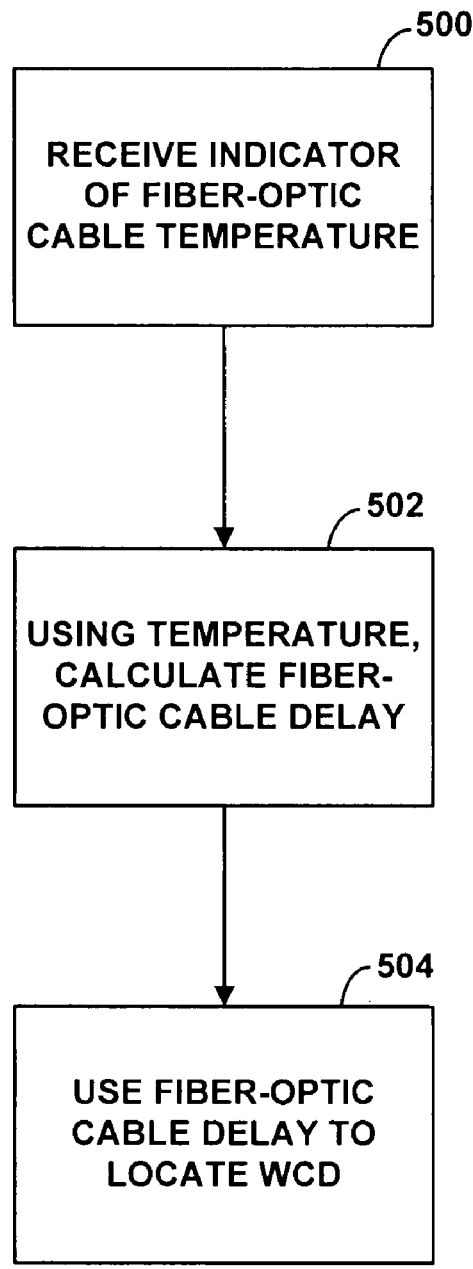
FIG. 5A is a flow chart illustrating a method for facilitating location of a wireless communication device in accordance with an exemplary embodiment.

FIG. 5A shows an exemplary method for facilitating location of a wireless communication device communicating via a communication path that includes a fiber optic cable. Specifically, the fiber optic cable may introduce delay that varies along with environmental conditions, and the exemplary method may improve triangulation by incorporating this delay. First, as shown in step 500, an indicator of the fiber optic cable temperature is received, generally by a positioning system. Next, in step 502, the temperature indicator is used to calculate a delay associated with the fiber optic cable. Then, as shown in step 504, the delay can be used for locating the wireless communication device. Specifically, when the WCD is communicating via a fiber-fed repeater, connected to a BTS with a fiber optic cable, the fiber optic cable delay can be used to determine the delay between the WCD and the repeater. A positioning system can then use attributes of the repeater, such as the WCD-repeater delay, for triangulation.

Figure 5B:
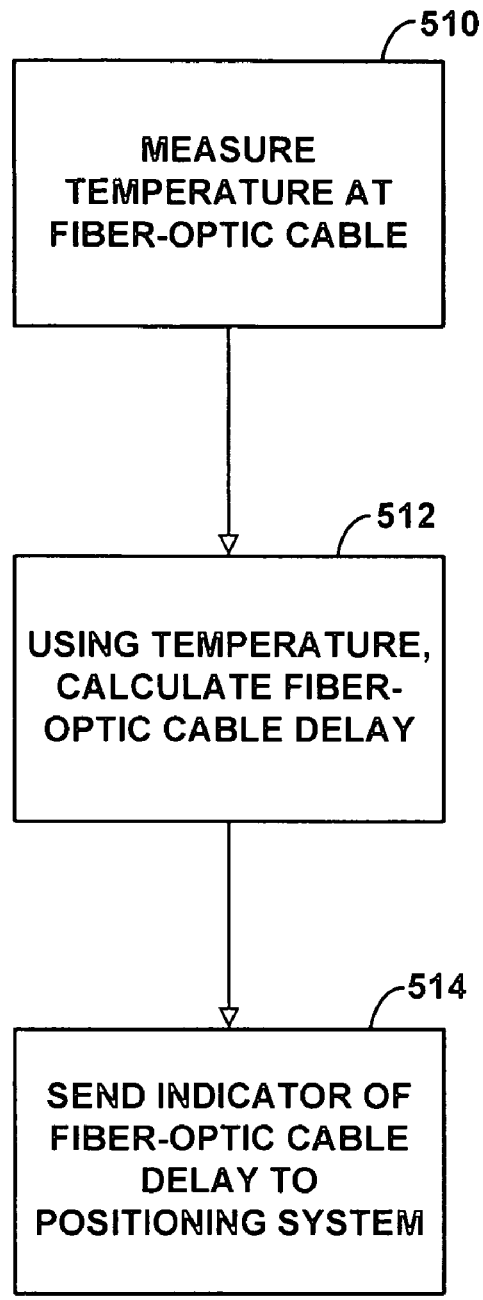
FIG. 5B is another flow chart illustrating a method for facilitating location of a wireless communication device in accordance with an exemplary embodiment.

FIG. 5B shows another exemplary method for facilitating location of a wireless communication device communicating via a communication path that includes a fiber optic cable. First, a temperature measuring device measures a temperature associated with a fiber optic cable, as shown in step 510. Next, in step 512, the temperature may be used to calculate a delay associated with the fiber optic cable. Specifically, the delay may be the time required for a communication to propagate through the fiber optic cable. Then, in step 514, an indicator of the delay may be sent to a positioning system. The positioning system can then use the delay indicator for locating the WCD. In an alternative embodiment, an indicator of the temperature, rather than an indicator of the delay, may be sent to the positioning system. In such an embodiment, the delay may not be calculated prior to sending the indicator. Instead, the positioning system may use the temperature indicator to calculate a fiber optic cable delay.

Figure 6:
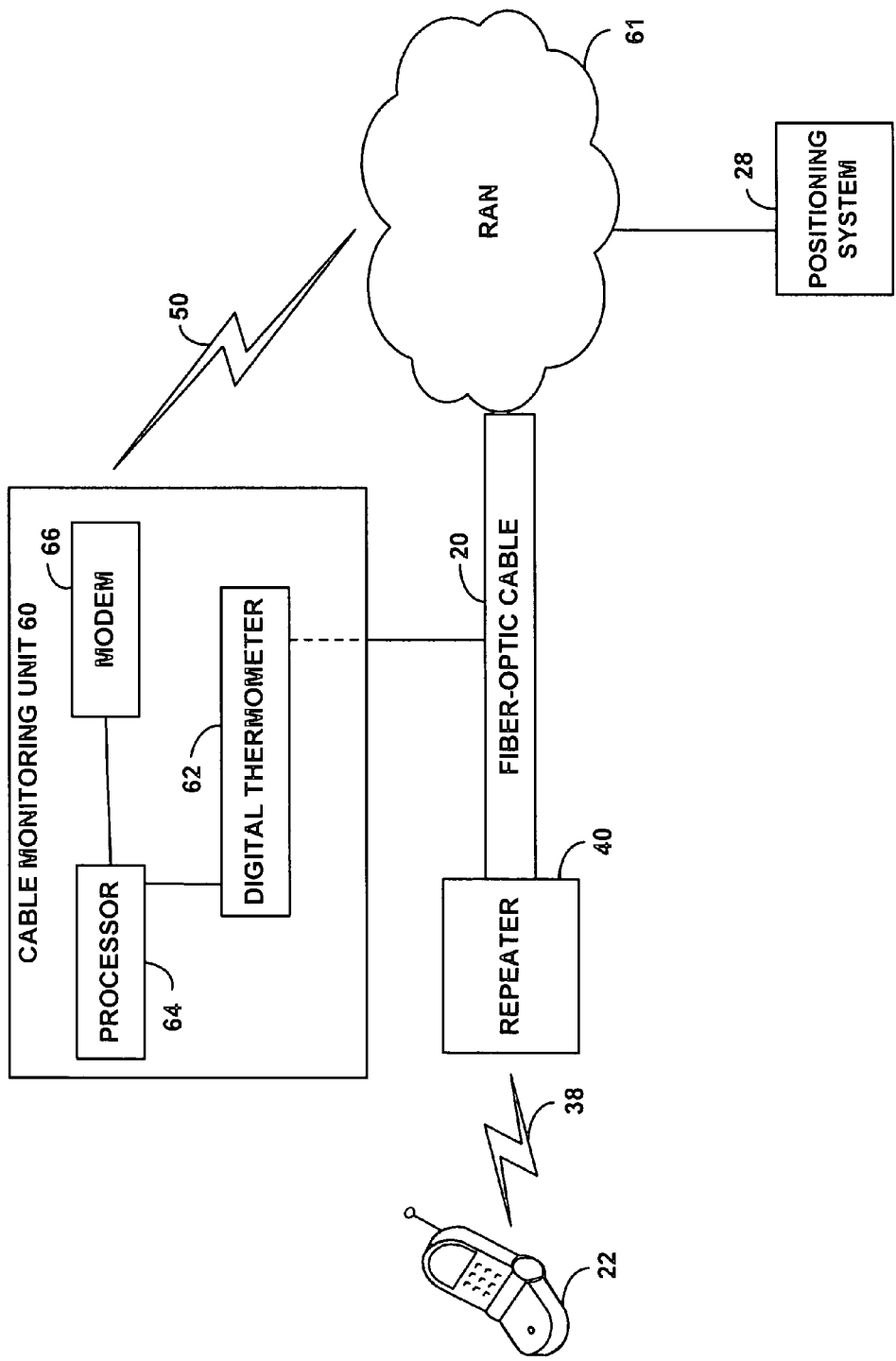
FIG. 6 is a functional block diagram illustrating components of a wireless communication system in accordance with an exemplary embodiment of the system.

FIG. 6 shows an exemplary system for facilitating location of a wireless communication device engaged in a communication via a communication path that includes a fiber optic cable. WCD 22 can communicate over an air interface 38 with a repeater 40. The fiber optic cable 20 connects the repeater 40 to RAN 61. The system may include a cable monitoring unit 60 housing a digital thermometer 62, a processor 64, and a modem 66. Processor 64 is communicatively coupled to thermometer 62 and modem 66. Cable monitoring unit 60 may function to calculate delay associated with fiber optic cable 20 using temperature measurements taken by thermometer 62. In addition, monitoring unit 60 may function to send an indicator of the delay to a positioning system 28 using modem 66. The positioning system 28 may use the delay when performing triangulation. Monitoring unit 60 may also include or have access to data storage (not shown). The data storage can maintain program logic, executable by the processor, for operating the system.

While FIG. 6 shows cable monitoring unit 60 as housing thermometer 62, processor 64, and modem 66, any of thermometer 62, processor 64, and/or modem 66, may be separately housed, external to monitoring unit 60. For example, the location of the fiber optic cable may require that digital thermometer 62 be located external to the monitoring unit (remaining communicatively coupled to the processor). Specifically, if the fiber optic cable is below-ground, the thermometer may also be located below-ground to more accurately measure the cable's temperature. However, the monitoring unit may be separately located above-ground for convenient access and maintenance. Cable monitoring unit 60 may also be located anywhere along fiber optic cable 20. For example, the monitoring unit can be placed at a central location along the cable. Alternatively, the, monitoring unit may be placed near the repeater, or included as a component of the repeater. Other examples are possible as well.

Processor 64 may execute program logic causing the modem 66 to send an indicator of delay associated with the fiber optic cable 20. Alternatively, the processor may execute program logic causing the modem to send an indicator of the temperature associated with the fiber optic cable. In either case, the respective indicator may be sent to a positioning system 28, or sent elsewhere. The positioning system 28 can use the indicator for locating WCD 22. Alternatively, the positioning system 28 can use an indicator of temperature to calculate a delay associated with the fiber optic cable 20, and then use the calculated delay for locating WCD 22.

Monitoring unit 60 may include additional functionality for sending an indicator of delay according to varying schedules, when prompted by various stimuli, and/or in response to various situations. As an example, monitoring unit 60 may periodically instruct modem 66 to send an indicator of delay to positioning system 28 (e.g. on an hourly basis). As such, positioning system 28 can maintain a record of the recent delay associated with fiber optic cable 20. It should be noted, that periodically reporting delay may not provide the positioning system the fiber optic cable delay at the exact time the system performs triangulation. However, temperature generally changes slowly enough that a recently reported delay, such as a delay reported within the last hour, is sufficient. In some embodiments, however, the system may sync reporting delay to the locating process. In such embodiments, delay indicators may be sent when the system detects or is informed that a WCD 22 is being located.

Modem 66 may take various forms, arranged to communicate via a landline or wireless connection. By way of example, modem 66 may be an MSM series chipset manufactured by Qualcomm (e.g., an MSM6700 or MSM6800 chipset), or some other chipset capable of cellular wireless connectivity. Such a chipset is of the type that would be conventionally included within a cellular telephone or other end-user WCD (e.g., wireless PDA, or wirelessly equipped computer) and advantageously enables the device to attain wireless packet-data connectivity so as to be able to engage in wireless IP-based communication. In a preferred embodiment, the MSM chipset would include logic compliant with CDMA2000, and preferably the well known 1XRTT and EVDO air interface standards. But the chipset could equally take other forms as well. For example, modem 66 may be a wired connection providing packet-data connectivity.

In order to send an indicator of delay, processor 64 may execute program logic for calculating a delay associated with fiber optic cable 20. Monitoring unit 60 may use temperature measurements taken by digital thermometer 62 for delay calculations. In an exemplary embodiment, processor 64 may receive a continual temperature reading from thermometer 62. In other embodiments, processor 64 may request a temperature reading from the thermometer 62. As another alternative, processor 64 may periodically receive a temperature reading from the thermometer, or may receive temperature measurements by other means.

Digital thermometer 62, or any other temperature measuring device, can measure the temperature associated with the fiber optic cable. Measurements can be taken in units determined by engineering design choice. For example, the thermometer may measure the temperature in degrees Celsius, degrees Fahrenheit, or any other measure of temperature. The thermometer 62 is preferably located so that the measured temperature accurately reflects the temperature of the fiber-optic cable. For example, the thermometer 62 may measure the temperature on the surface of the cable. As another example, if the fiber-optic cable 20 is located below-ground, the thermometer may measure the temperature of the earth surrounding the cable. As a further example, if the fiber-optic cable 20 is above-ground, the air temperature near the cable may be measured. Other possibilities exist as well. In addition, the location of the thermometer 62 along the fiber-optic cable 20 may vary. For instance, the thermometer may be placed near repeater 40, or at a central location along fiber-optic cable 20, or elsewhere.

When calculating fiber optic cable delay, processor 64 may account for temperature deviation by employing a delay adjustment coefficient associated with fiber optic cable 20. The delay adjustment coefficient is generally a known constant determined by the type of fiber optic cable used (the type of fiber optic cable is a matter of engineering design choice). Manufacturers of fiber optic cable generally specify a delay for their cables at a specific temperature. However, the actual delay will deviate from the manufacturer specified delay as temperature changes. By using a delay adjustment coefficient, the system can account for variations in delay due to temperature changes. For instance, by multiplying the delay adjustment coefficient by the length of the cable and the temperature, the system can determine by how much the manufacturer specified delay should be adjusted. In embodiments where the manufacturer has not specified a delay, the delay at a specific temperature can be measured before deploying the system.

As a specific example of system calculations, the monitoring unit 60 may determine the delay associated with a 10 kilometer cable made of single mode fiber, for which the manufacturer's delay specification at a specified temperature is 30 μsec. Single mode fiber may have a delay adjustment coefficient of 30 picoseconds per kilometer per degree Celsius. Therefore, if the measured temperature differs from the temperature of the manufacturer specified delay, processor 64 may adjust the manufacturer's delay by 30 picoseconds per kilometer per degree Celsius. For example, if the temperature differs by 30 degrees Celsius, processor 64 may adjust delay by performing the calculation, (30 picoseconds/(degree Celsius*kilometer))*10 kilometers*30 degrees Celsuis=9 μsec adjustment. Therefore, the calculated delay for the 10 kilometer, single mode fiber optic cable, would be 21 μsec.

In addition to single temperature measurements, monitoring unit 60 may consider other factors when calculating delay. As an example, the monitoring unit may periodically store temperature readings in data storage, creating a history of temperatures. The monitoring unit 60 may then use the temperature history to adjust delay calculations. For example, temperature history may be used to account for any difference in the rate of temperature change for the fiber optic cable, as compared to the rate of temperature change for the material surrounding the cable. As another example, temperature readings from multiple locations associated with the fiber optic cable may be included in delay calculations. Other factors may be incorporated as well.

Figure 7:
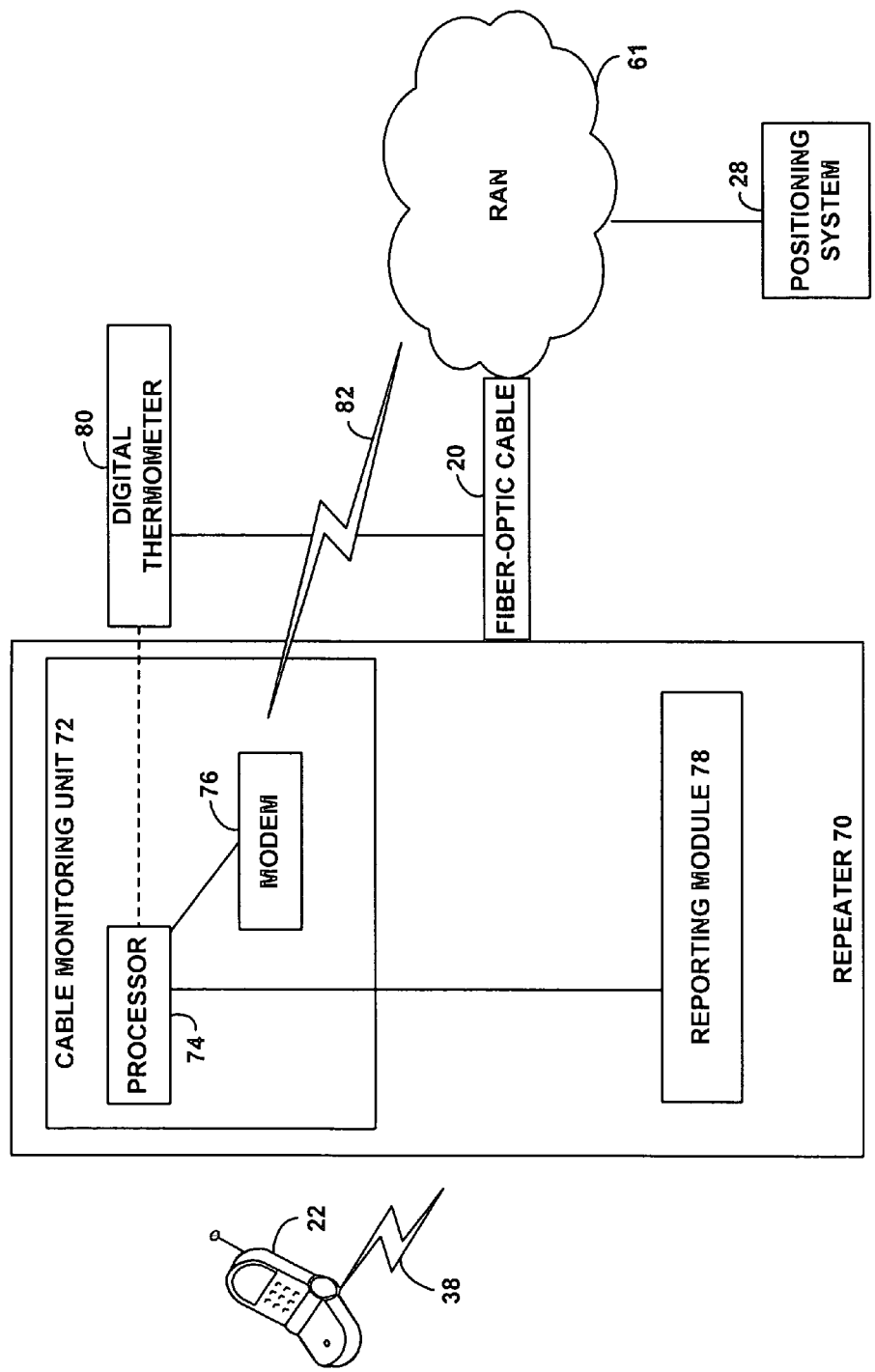
FIG. 7 is also a functional block diagram illustrating components of a wireless communication system in accordance with an exemplary embodiment of the system.

FIG. 7 is another exemplary system for facilitating location of a wireless communication device communicating via a communication path that includes a fiber optic cable. FIG. 7 depicts an embodiment where repeater 70 includes cable monitoring unit 72. Cable monitoring unit 72 may include processor 74 and modem 76. Repeater 70 also includes a reporting module 78 that is operable to detect a predetermined characteristic or characteristics in a communication and responsively send a repeater location message to a positioning system 28. The repeater location message can provide attributes of the repeater that facilitate triangulation techniques for locating WCD 22. Such attributes may include the location of the repeater and/or the delay associated with the repeater.

Various configurations of the system depicted in FIG. 7 are possible. Reporting module 78 may be communicatively coupled to processor 74 or, alternatively, cable monitoring unit 72 and reporting module 78 may be combined as a single component. When cable monitoring unit 72 is included as a component of, or attached to, repeater 70, digital thermometer 80 may be housed separately from monitoring unit 72. As a specific example, when repeater 70 is located indoors, the thermometer will likely be placed outdoors to read the air or ground temperature near the cable. In an alternative configuration of the system, monitoring unit 72 may be housed externally to repeater 70. When separately located, monitoring unit 72 may communicate with repeater 70 using a wired connection. Alternatively, repeater 70 may include a wireless modem (not shown) for communicating with monitoring unit 72. Other arrangements are possible as well.

Monitoring unit 72 may work with reporting module 78 to provide an indicator of fiber optic cable delay to a positioning system when a WCD is being located. To do so, the system may send an indicator of fiber optic cable delay whenever a repeater location message is sent to a positioning system. Reporting module 78 may function to send a repeater location message to positioning system 28 when repeater 70 detects a communication possessing a predetermined characteristic (e.g. an emergency 9-1-1 phone call). For example, repeater 70 may send a repeater location message when a phone call has the dialed digits "9-1-1," a characteristic that often indicates that location of the calling party is necessary. Therefore, when reporting module 78 detects a characteristic invoking a repeater location message, monitoring unit 72 may simultaneously report delay associated with fiber optic cable 20.

As an alternative to simultaneously sending a delay indicator and a repeater location message, reporting module 78 may include the delay associated fiber optic cable 20 in the repeater location message. In such an embodiment, processor 74 may execute program logic incorporating the functionality of both the monitoring unit and the reporting module. Specifically, processor 74 may execute program logic to detect a predefined characteristic in a communication, calculate fiber optic cable delay, and responsively instruct modem 76 to send a repeater location message. The repeater location message may include the fiber optic cable delay, and/or other data. The inclusion of the fiber optic cable delay in the repeater location message may remove the need for separate reporting of fiber optic cable delay by the monitoring unit.

Figure 8:
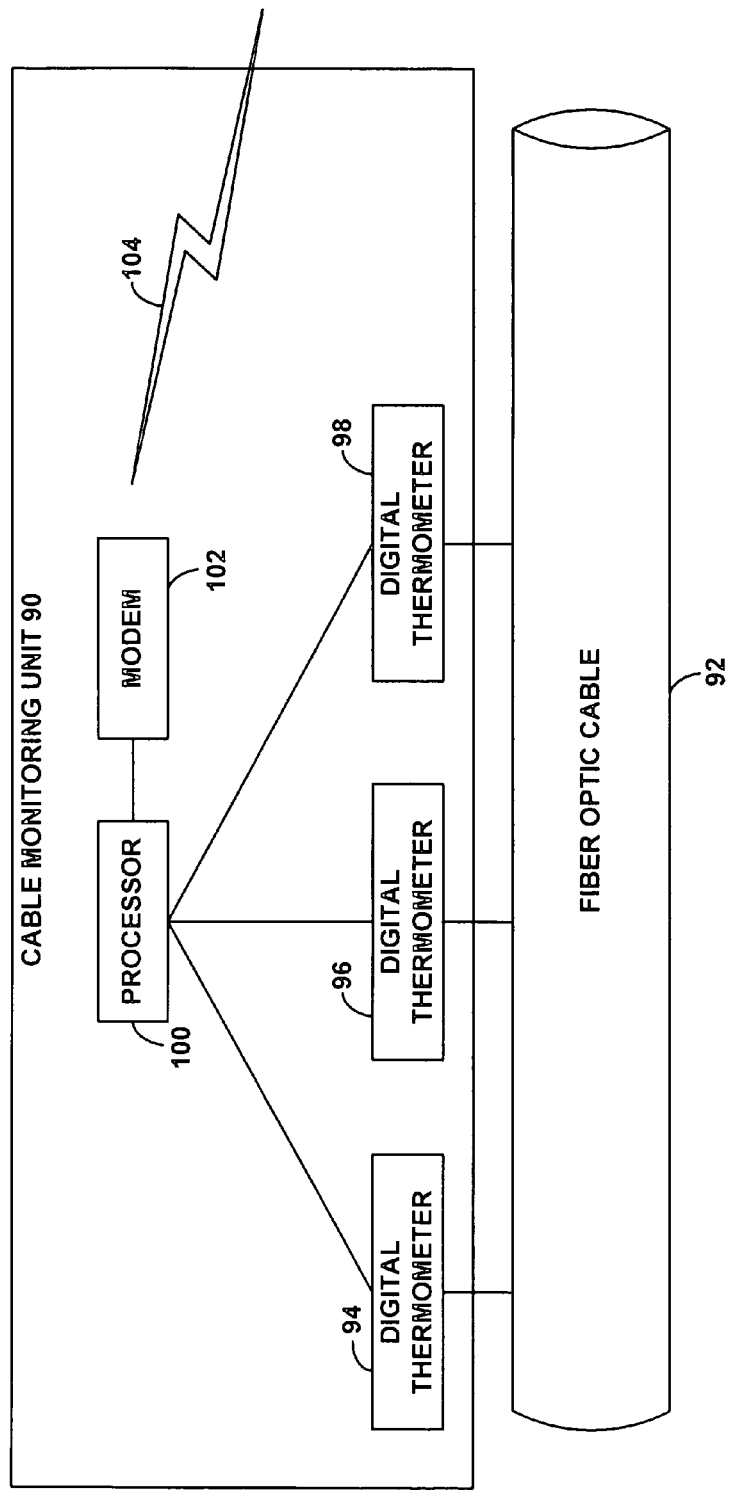
FIG. 8 is also a functional block diagram illustrating components of a wireless communication system in accordance with an exemplary embodiment of the system.

FIG. 8 shows a cable monitoring unit in an alternative embodiment of the system. Cable monitoring unit 90 operates to calculate a delay associated with a signal propagating through fiber optic cable 92. Fiber optic cable 92 may connect a fiber-fed repeater (not shown) to a RAN (not shown) in a similar manner to the systems depicted in FIGS. 6 and 7. Monitoring unit 90 includes a plurality of temperature measuring devices, shown as digital thermometers 94-98. In addition, monitoring unit 90 includes a processor 100 that is communicatively coupled to thermometers 94-98. Processor 100 functions to use a plurality of temperature measurements to calculate delay associated with fiber optic cable 92. Processor 100 is also operable to instruct modem 102 to send an indicator of delay associated with fiber optic cable 92 to any remote location, such as a positioning system.

Digital thermometers 94-98 may function to measure temperature associated with fiber optic cable 92 at a plurality of geographic locations. In FIG. 8, the temperature measuring devices are digital thermometers 94-98. However, the temperature measuring devices can take other forms as well. In addition, while only three temperature measuring devices are depicted, digital thermometers 94-98, any number of temperature measuring devices may be employed by the system. By considering a plurality of temperature measurements, at various points along fiber optic cable 92, processor 100 may further improve delay calculations.

More specifically, processor 100 may execute program logic for calculating delay based, at least in part, on a plurality of temperature readings taken at a plurality of geographic locations. Each thermometer 94-98 may be operable to communicate a temperature measurement associated with the geographic location of the thermometer, to processor 100. Processor 100 can then consider the plurality of temperature measurements from thermometers 94-98, rather than basing delay calculations on a single temperature measurement. For example, processor 100 may average of the temperature measurements taken by thermometers 94-98, and use the average temperature to calculate delay.

Further, processor 100 may use of the geographic locations associated with the temperature measurements to further improve calculation of delay. As an example, the monitoring unit 90 may use the geographic locations of thermometers 94-98 to calculate a separate delay for multiple segments of fiber optic cable, totaling the delay for all segments to determine the delay associated with the entire cable. To do so, the cable may be divided into multiple segments, each segment associated with a temperature from a different digital thermometer. For instance, a first segment may measure from the beginning of fiber optic cable 92 to halfway between digital thermometer 94 and digital thermometer 96 and be associated with digital thermometer 94. A second segment may extend from halfway between thermometer 94 and 96, to halfway between thermometer 96 and 98, and so on. Other segmenting procedures are possible as well. The processor can then determine the delay for each segment using the length of the segment, the temperature measurement from the thermometer associated with the segment, and the delay coefficient for the cable. Additionally, delays from each segment can be weighted, based on the length of the associated segment as compared to the length of the cable, when totaling segment delays to ascertain the delay for the cable.

Segmenting the cable may further improve delay calculations in many situations, such as when cables pass through multiple temperature environments. As an example, a segment of a cable may be located below-ground, and associated with a below-ground temperature, while another segment of the same cable may be located above-ground, and associated with an above-ground temperature. When a fiber optic cable is located partially above and below-ground, segmenting the cable may further improve delay calculations accounting for variance in temperature along the cable.

An exemplary embodiment of the invention has been described above. Those skilled in the art will understand, however, that changes and modifications may be made to the embodiment described without departing from the true scope and spirit of the invention, which is defined by the claims.

We claim:

1. A method for determining the location of a wireless communication device communicating via a communication path, wherein the communication path includes a fiber optic cable, the method comprising:
receiving a plurality of temperature measurements associated with the fiber optic cable, wherein each temperature measurement indicates the temperature at a different location along the fiber optic cable;
using the plurality of temperature measurements as a basis to determine a delay associated with the fiber optic cable, wherein using the plurality of temperature measurements as a basis to determine the delay associated with the fiber optic cable comprises:
based on the plurality of temperature measurements, determining an average temperature for the fiber optic cable; and
multiplying the average temperature by a delay coefficient associated with the fiber optic cable; and
using the determined delay as a basis to determine a location of the wireless communication device.

2. The method of claim 1, wherein using the plurality of temperature measurements as a basis to determine the delay associated with the fiber optic cable further comprises:
multiplying the average temperature by a length of the fiber optic cable.

3. The method of claim 1, wherein using the determined delay as a basis to determine the location of the wireless communication device comprises:
performing triangulation to determine the location of the wireless communication device; and
factoring the determined delay into the triangulation.

4. The method of claim 3 wherein performing triangulation comprises:
receiving a mobile reported delay from a network entity, wherein the mobile reported delay indicates the delay between the network entity and the wireless communication device;
calculating an adjusted delay by subtracting the delay associated with the fiber optic cable from the mobile reported delay; and
using the adjusted delay as a basis for performing triangulation.

5. A method for facilitating a determination of location of a wireless communication device communicating via a communication path, wherein the communication path includes a fiber optic cable, the method comprising:
measuring a temperature associated with the fiber optic cable at each of a plurality of locations along the fiber optic cable;
using the plurality of measured temperatures as a basis to determine a delay associated with the fiber optic cable, wherein using the plurality of temperature measurements as a basis to determine the delay associated with the fiber optic cable comprises:
based on the plurality of temperature measurements, determining an average temperature for the fiber optic cable; and
multiplying the average temperature by a delay coefficient associated with the fiber optic cable; and
sending an indicator of the determined delay to a positioning system for use by the positioning system as a basis to determine a location of the wireless communication device.

6. The method of claim 5, wherein the method is carried out by a repeater that is connected to a radio access network via the fiber optic cable.

7. The method of claim 6, wherein sending the indicator of the determined delay to the position-determining system comprises sending a repeater-location message to the positioning system, the repeater-location message including the indicator of the determined delay.

8. The method of claim 6, wherein sending the indicator of the determined delay to a position-determining system comprises:
detecting a predefined characteristic in a communication passing between the wireless communication device and the radio access network; and
in response to detecting the predefined characteristic in the communication, sending a repeater-location message to the position-determining system, the repeater-location message including the indicator of the determined delay.

9. The method of claim 8, wherein the predetermined characteristic in the communication is a characteristic indicating that the communication is an emergency communication.

10. The method of claim 5, wherein:
using the plurality of measured temperatures as a basis for determining the delay associated with the fiber optic cable further comprises:
associating a section of the fiber optic cable with each of the measured temperatures; and
assigning a significance to each of the measured temperatures, wherein the significance is based, at least in part, on the length of the section associated with the measured temperature; and
using the plurality of measured temperatures proportionally, according to the significance assigned to each of the measured temperatures, as a basis for calculating the delay associated with the fiber optic cable.

11. A system for facilitating a determination of location of a wireless communication device engaged in a communication via a communication path, wherein the communication path comprises a fiber optic cable, the system comprising:
a processor for executing program logic; and
data storage communicatively linked with the processor, the data storage containing:
program logic executable by the processor to receive a plurality of temperature measurements associated with the fiber optic cable, wherein each temperature measurement indicates the temperature at a different location along the fiber optic cable;
program logic executable by the processor to use the plurality of temperature measurements associated with the fiber optic cable to determine a delay associated with the fiber optic cable by:
  use of the plurality of temperature measurements as a basis to determine an average temperature for the fiber optic cable; and
  multiplication of the average temperature by a delay coefficient associated with the fiber optic cable; and
program logic executable by the processor to use the determined delay as a basis for locating the wireless communication device.

12. The system of claim 11, wherein each temperature measurement is received from one of a plurality of temperature measuring devices, wherein each temperature measuring device is located at a different location along the fiber optic cable and is configured to measure a temperature associated with the location.

13. The system of claim 12, further comprising a plurality of fiber optic monitoring modules, wherein each fiber optic monitoring module includes one of the temperature measuring devices.

14. The system of claim 13, wherein the system is located at a repeater, and wherein each fiber optic monitoring module is communicatively coupled to the system.

15. The system of claim 11, wherein the communication path further comprises a repeater communicatively coupled to the radio access network via the fiber optic cable.

16. The system of claim 15, wherein the repeater comprises the processor, the reporting modem, and the data storage.

17. The system of claim 16, wherein the data storage is located at a repeater or at a positioning system in communication with a repeater.

18. The system of claim 11, wherein the system is implemented at a repeater, and wherein the data storage further comprises program logic for creating a repeater-location message based, at least in part, on the delay associated with the communication passing through the fiber optic cable, and wherein the repeater location message comprises the indicator of the delay that can be used by the positioning system as a basis for locating the wireless communication device.

* * * * *